US008534851B2

(12) United States Patent
    Spencer

(10) Patent No.: US 8,534,851 B2
(45) Date of Patent: Sep. 17, 2013

(54) MULTIPLE PATH SUBSTANTIALLY SYMMETRIC THREE-MIRROR ANASTIGMAT

(75) Inventor: Susan B. Spencer, Rollings Hills Estates, CA (US)

(73) Assignee: Raytheon Company, Waltham, MA (US)

( * ) Notice: Subject to any disclaimer, the term of this patent is extended or adjusted under 35 U.S.C. 154(b) by 417 days.

(21) Appl. No.: 12/840,054

(22) Filed: Jul. 20, 2010

(65) Prior Publication Data

US 2012/0019943 A1    Jan. 26, 2012

(51) Int. Cl.
    *G02B 5/10* (2006.01)
(52) U.S. Cl.
    USPC .......................................................... 359/859
(58) Field of Classification Search
    USPC .................. 359/399, 420, 423, 434, 850–861
    See application file for complete search history.

(56) References Cited

U.S. PATENT DOCUMENTS

| | | | |
|---|---|---|---|
| 4,101,195 A | 7/1978 | Korsch | |
| 4,265,510 A | 5/1981 | Cook | |
| 4,964,706 A | 10/1990 | Cook | |
| 5,227,923 A | 7/1993 | Kebo | |
| 5,477,395 A | 12/1995 | Cook | |
| 6,016,220 A | 1/2000 | Cook | |
| 6,195,201 B1 * | 2/2001 | Koch et al. | 359/366 |
| 6,333,811 B1 * | 12/2001 | Tatian et al. | 359/366 |
| 7,433,120 B2 | 10/2008 | Cook | |

OTHER PUBLICATIONS

Lampton, M. et al., "Comparison On-Axis Three-Mirror-Anastigmat Telescopes," Proc. SPIE, vol. 6687, pp. 66870S-66870S-8 (2007).

* cited by examiner

*Primary Examiner* — Jennifer L. Doak
(74) *Attorney, Agent, or Firm* — Daly, Crowley, Mofford & Durkee, LLP

(57) ABSTRACT

One or more embodiments of an optical system includes a primary mirror configured to reflect light incident thereupon; a secondary mirror facing the primary mirror configured to receive the light reflected from the primary mirror and redirect the light reflected from the primary mirror in multiple channels; and one or more tertiary mirrors of common prescriptions, configured to reflect divergent light rays incident from the secondary mirror in multiple channels.

18 Claims, 6 Drawing Sheets

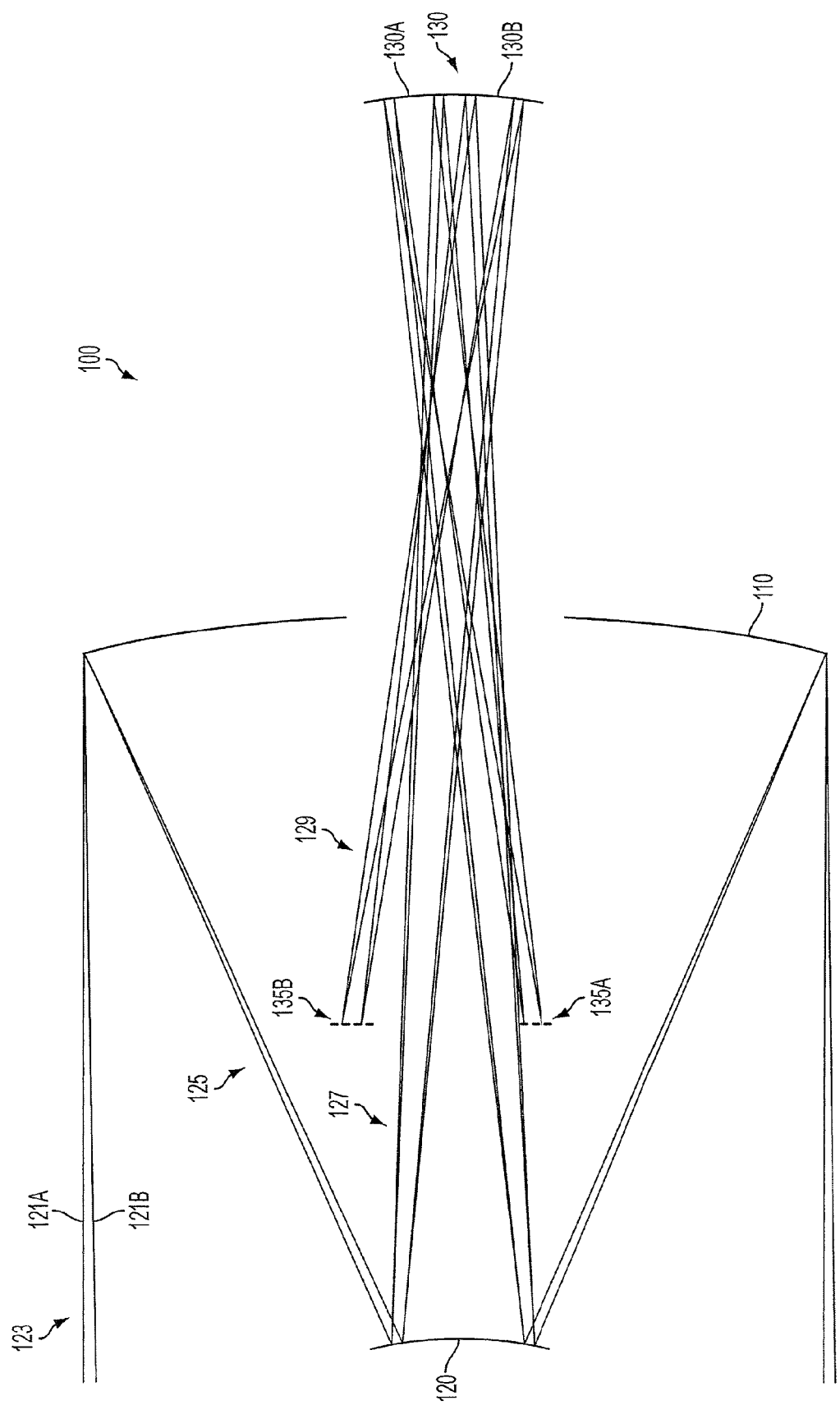

| Optical System Design Element | Parameter values optical channel 1 | Parameter values optical channel 2 |
|---|---|---|
| Primary mirror | | |
| Radius of curvature (in) | - 223.2 | - 223.2 |
| Conic Constant | - 0.992082 | - 0.992082 |
| Secondary mirror | | |
| Radius of curvature (in) | -47.94183 | -47.94183 |
| Conic Constant | -1.919069 | -1.919069 |
| Tertiary Mirror | | |
| Radius of curvature (in) | -60.45424 | -60.45424 |
| Conic Constant | -0.698959 | -0.698959 |
| Decenter (y - in) | -0.25748 | -0.28126 |
| Tilt (alpha - deg) | -0.53085 | -0.63372 |
| Field offset (deg) | 0.34358 | -0.34358 |
| Distance between PM and SM (in) along the boresight ray | 91.7275556986 | 91.7262605762 |
| Distance between SM and TM (in) along the boresight ray | 157.00218515 | 156.997815751 |
| Distance between TM and image plane (in) along the boresight ray | 118.223124806 | 118.056274559 |

FIG. 4

| Optical System Design Element | Parameter values optical channel 1 | Parameter values optical channel 2 |
|---|---|---|
| Primary mirror | | |
| Radius of curvature (in) | - 223.2 | - 223.2 |
| Conic Constant | - 0.992082 | - 0.992082 |
| Secondary mirror | | |
| Radius of curvature (in) | -49.78127 | -49.78127 |
| Conic Constant | -1.841455 | -1.841455 |
| Tertiary Mirror | | |
| Radius of curvature (in) | -64.10273 | -64.10273 |
| Conic Constant | -0.70120 | -0.70120 |
| Decenter (y - in) | -0.28966 | -0.14656 |
| Tilt (alpha - deg) | -0.38829 | -0.44166 |
| Field offset (deg) | 0.50000 | -0.50000 |
| Distance between PM and SM (in) along the boresight ray | 90.7097831992 | 90.7084745728 |
| Distance between SM and TM (in) along the boresight ray | 174.000883983 | 173.999121999 |
| Distance between TM and image plane (in) along the boresight ray | 120.352268339 | 120.174078746 |

FIG. 5

MULTIPLE PATH SUBSTANTIALLY SYMMETRIC THREE-MIRROR ANASTIGMAT

BACKGROUND

The present disclosure relates to reflective optical systems and in particular relates to three-mirror anastigmatic optical systems or telescopes. Such systems may be utilized in any number of settings, including but not limited to ground to space based observation, space to space based observation, and space to ground based observation, for any number of purposes, including but not limited to astronomical research, commercial terrestrial imaging, and reconnaissance.

Conventional three mirror anastigmatic optical systems generally comprise at least three non-flat optical elements: a primary mirror, a secondary mirror, and a tertiary mirror. The combination of the three mirrors in such systems is configured to correct for spherical aberration, coma, and astigmatism. An example of a conventional all-reflective focal three-mirror anastigmat telescope is illustrated by U.S. Pat. No. 4,101,195 to Korsch, entitled "Anastigmatic Three-Mirror Telescope," the entire contents of which are incorporated herein by reference. Korsch discloses a focal three-mirror telescope having ellipsoidal primary and tertiary mirrors, and a hyperbolic secondary mirror, with the three mirrors producing an image in a conveniently located finite plane for viewing, or measurement.

Some optical systems require multiple light paths, or channels, to provide for different measurement phenomenology. Such channels may be defined by, for example, light beams of particular wavelength bands (i.e. visible channels or infrared channels). To enhance performance in each channel, optical designs often use common fore-optics assemblies, (i.e. comprising the primary and secondary mirrors), and different tertiary and/or quaternary mirrors, each having different prescriptions for each channel.

Manufacturing tertiary mirrors and/or quaternary to different optical prescriptions may add to the cost of an optical system, for example by increasing the time and resources needed to fabricate the tertiary or quaternary mirrors to the different optical prescriptions, and by decreasing the number of similar elements in the optical system. Additionally, the use of differently shaped tertiary (or quaternary mirrors) may result in an additional testing and integration costs.

Furthermore, in some optical systems, utilizing different tertiary (or quaternary) mirrors when collecting and separating different channels of electromagnetic radiation may result in awkward asymmetrical packaging for the telescope system elements, as well as the totality of the optical system. Such packaging may further increase the cost of manufacture, with added expense to fabricate a broadly asymmetrical mount, as well as increased integration costs.

What is needed is a simplified way to economically manufacture three mirror anastigmatic optical systems.

SUMMARY

In an embodiment, an optical system comprises a primary mirror having a central axis, configured to reflect light incident thereupon. The optical system further comprises a secondary mirror facing the primary mirror. The secondary mirror is configured to receive the light reflected from the primary mirror and redirect the light reflected from the primary mirror in a plurality of light channels. In one embodiment of the optical system, the secondary mirror has a secondary mirror tilt and decenter with respect to the central axis of the primary mirror. The optical system further includes at least two tertiary mirror elements, each sharing a common tertiary mirror prescription, but having a respective tertiary mirror element tilt and decenter associated with one of the plurality of light channels. The respective tertiary mirror element tilt and decenter are configured to reflect associated light channels to an associated focal point for each of the plurality of light channels.

In another embodiment, a method comprises reflecting, using a primary mirror, light rays incident thereon. The method further includes reflecting, using a secondary mirror facing the primary mirror, the light rays received from the primary mirror, as a plurality of light channels. The method further includes reflecting, using a plurality of tertiary mirror surfaces, the plurality of light channels to focal points associated with each light channel. Each of the tertiary mirror surfaces in the method share a common tertiary mirror prescription. Additionally, each of the tertiary mirror surfaces has an associated tilt and decenter configured to separate associated light channels of the plurality of light channels.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not a limitation of the invention. In addition, it should be appreciated that structural features shown or described in any one embodiment herein can be used in other embodiments as well.

BRIEF DESCRIPTION OF THE DRAWINGS

Various features and embodiments of this disclosure are shown in the drawings, in which like reference numerals designate like elements.

FIG. 1 illustrates a ray-trace section of an embodiment of an optical system of the present disclosure that is constructed with identical prescriptions for tertiary mirror surfaces, showing a plurality of initial field offsets being diverged into multiple light channels;

FIG. 4 is one example of an optical prescription that can be utilized in accordance with an embodiment; and FIG. 5 is another example of an optical prescription that can be utilized in accordance with an embodiment.

DETAILED DESCRIPTION

Figure 2A:
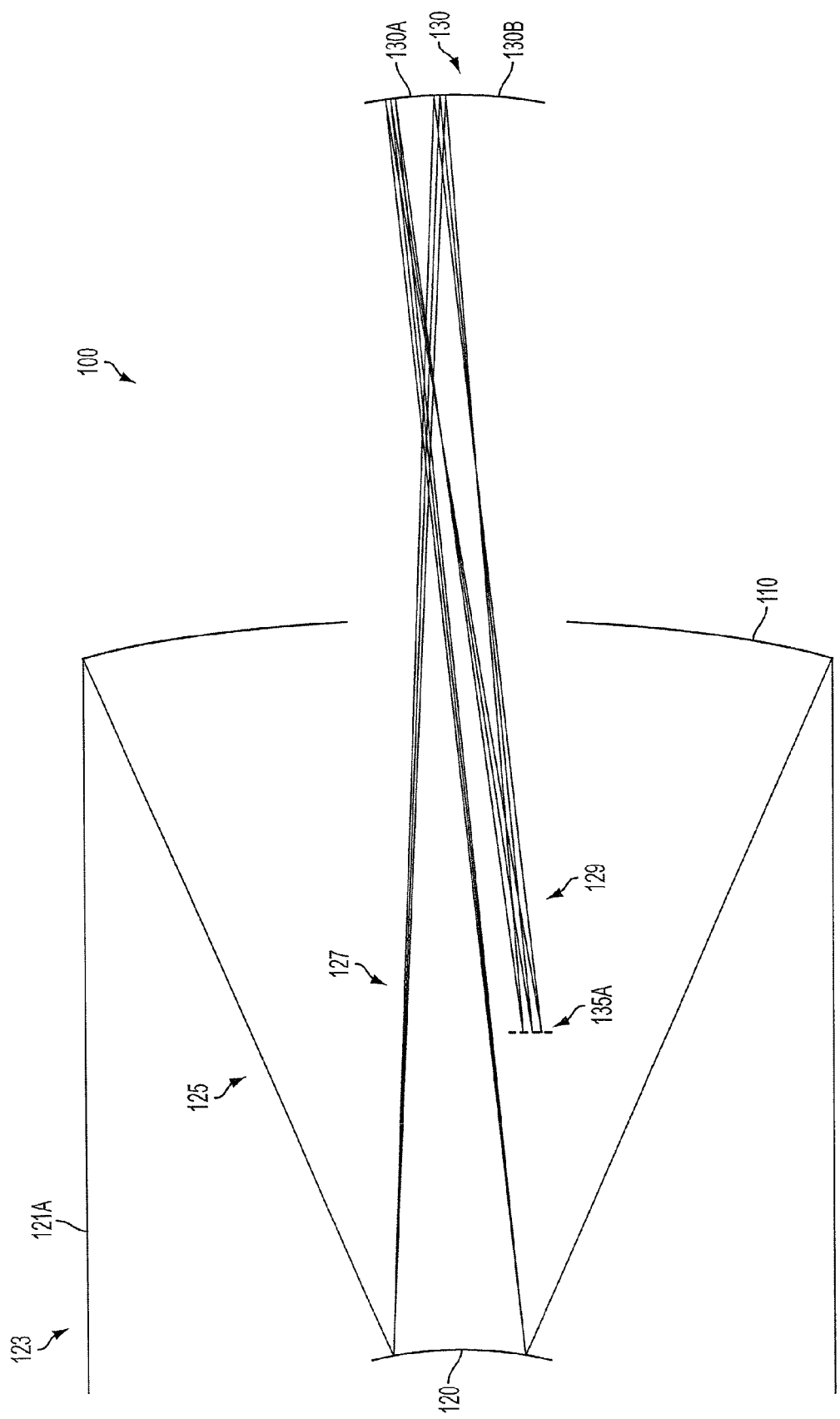
FIGS. 2A and 2B depict the ray traces of each light channel of FIG. 1, illustrating how the optical system may diverge the light channels based on a different initial field offset.

According to an aspect of the present disclosure, a three-mirror anastigmat optical system may be constructed to optimize two or more beam paths using different tilts and decenters of identically shaped tertiary mirrors. Such optimization may be less costly than manufacturing, testing, and integrating multiple tertiary mirrors with different optical fabrication prescriptions, while remaining within acceptable performance tolerances.

FIG. 1 illustrates a ray-trace section of optical system 100. In an embodiment, optical system 100 may comprise a three mirror anastigmat system. In an embodiment, optical system 100 may be configured to at least correct for spherical aberration, coma, and astigmatism. Optical system 100 may utilize any suitable construction or configuration, including but not limited to elements of Cassegrain or Ritchey-Chretien style reflecting telescopes. As the illustrated embodiment depicts, optical system 100 is focal by design. As seen, optical system 100 may include a fore optics assembly, which includes primary mirror 110 and secondary mirror 120. Primary mirror 110 may be of any suitable construction or configuration, including but not limited to an arrangement corresponding to an F-number of approximately F/1.2. Optical system 100 may receive and reflect electromagnetic radiation in multiple light paths, or channels 121 (i.e., channels 121A and 121B), as will be described in greater detail below. Incoming electromagnetic radiation 123 in each of channels 121A-B may be emitted or reflected from the target area and may be received and reflected by primary mirror 110 as beams 125 to secondary mirror 120. Secondary mirror 120 is configured to receive beams 125 from primary mirror 110, and reflect rays 127, as will be described in greater detail below.

In some embodiments, primary mirror 110 may include an aperture therein for rays 127, reflected from secondary mirror 120, to pass behind primary mirror 110. In other embodiments, optical system 100 may incorporate an off-axis design, such as, for example, by tilting primary mirror 110, to prevent secondary mirror 120 from obstructing incoming rays 123 impinging on primary mirror 110, or to eliminate the need for rays 127 to pass through any portion of primary mirror 110 to reach additional optics elements.

As shown in FIG. 1, optical system 100 may also include tertiary mirror surfaces 130, configured to receive beams 127 in each channel 121A-B from secondary mirror 120. Tertiary mirror surfaces 130 may be configured to reflect the beams 127 as corrected electromagnetic radiation 129 separately for each channel 121A-B. In an embodiment, corrected electromagnetic radiation 129 may be received at one or more detectors. In an embodiment, there may be a separate detector for each of channels 121A-B of the electromagnetic radiation, as will be discussed in greater detail below. In other embodiments, the beams 127, received by tertiary mirror surfaces 130 and reflected as corrected electromagnetic radiation 129, may be received by further optics, including but not limited to quaternary mirrors. In an embodiment, the further optics may be configured to further compact the electromagnetic radiation from each of the multiple channels, before directing corrected electromagnetic radiation 129 to the one or more detectors, typically in respective image planes 135A and 135B.

As noted above, in an embodiment, optical system 100 may be configured to receive incoming electromagnetic radiation 123 in two or more channels 121, such as channels 121A and 121B, as illustrated. In an embodiment, each channel 121A and 121B may correspond to a particular wavelength band of incoming electromagnetic radiation 123. For example, optical system 100 may be configured to receive both visible electromagnetic radiation and infrared electromagnetic radiation. In an embodiment, visible electromagnetic radiation and infrared electromagnetic radiation may be received at a different field offset, or the angle at which incoming electromagnetic radiation 123 intersects primary mirror 110. For example, as seen in FIG. 1, optical system 100 may be configured to receive first channel 121A of visible electromagnetic radiation at about a −0.343577° field offset, for example, while being configured to receive a second channel of infrared electromagnetic radiation at about a +0.343577° field offset. In an embodiment, movement of optical system 100 may be utilized to image the same target in both channels 121, by changing the angle of primary mirror 110 to the target area, so as to receive electromagnetic radiation at different field offsets.

The field offsets of the incoming electromagnetic radiation 123 in each channel 121 may vary in different embodiments. In some embodiments, the initial field offset may change so that a desired characteristic of at least one other optical element or ray path in optical system 100 may be achieved. In an embodiment, a smaller field offset at primary mirror 110 may correspond to greater field offsets at secondary mirror 120 and tertiary mirror surfaces 130. In an embodiment, the detectors receiving corrected electromagnetic radiation 129 from optical system 100 may comprise sensors configured for time delay integration of corrected electromagnetic radiation 129. In an embodiment the detectors may be customized to account for time delay integration distortion for each channel 121. In an embodiment, the detectors may be further configured to account for wavefront error resulting from optical system 100.

In various embodiments, a prescription for each of the optical elements in optical system 100 may be tailored to achieve configurations in accordance with the present disclosure. For example, in the illustrated non-limiting embodiment, primary mirror 110 may have a radius of curvature of about −223.2 (in), and a conic constant of about −0.992082, configured to focus incoming electromagnetic radiation 123, reflected as beams 125 towards secondary mirror 120. Also in the illustrated embodiment, secondary mirror 120 may have a radius of curvature of about −47.94183 (in), and a conic constant of about −1.919069, configured to reflect beams 125 as rays 127 through the aperture in primary mirror 110. In an embodiment, secondary mirror 120 may be tilted and decentered, and may further separate channels 121A and 121B from one another. In an embodiment, the tilt and decenter of secondary mirror 120 may be configured to prefer the shorter wavelength band of the channels 121A-B (i.e., visible channel 121A in the illustrated embodiment). For example, in the illustrated embodiment the secondary mirror may be decentered by about −0.045735 (in), and tilted about −0.122095°. Such a tilt and decenter favoring shorter wavelength channel 121A may be useful in obtaining acceptable time delay integration performance, as longer wavelengths channel 121B may be more receptive to tilt and decentering adjustments.

In an embodiment, the fore-optics of primary mirror 110 and secondary mirror 120 may be configured to separate channels 121A-B such that rays 127 are divergent to impact separate tertiary mirror surfaces 130, such as tertiary mirror surface 130A associated with channel 121A, and tertiary mirror surface 130B associated with channel 121B. In an embodiment, tertiary mirror surfaces 130A and 130B may have identical prescriptions, however may be performance optimized for each channel 121A and 121B respectively by various tilts and decenters. Such identical prescriptions may reduce the cost of manufacture of optical system 100, for example by allowing a greater number of identical parts, reducing the need to fabricate unique elements. Identical prescriptions may also allow for optical system 110 to include a substantially or completely symmetrical mounting system for each of optical elements, but for the various tilts and decenters, as will be discussed below.

In the illustrated embodiment, tertiary mirror surfaces 130A and 130B may each have a radius of curvature of about −60.45424 (in), and a conic constant of about −0.69896. In an embodiment, the tertiary mirror surfaces 130A-B may have different tilts and decenters, so as to further diverge associated channels 121A-B. As seen in the illustrated embodiment, tertiary mirror surfaces 130A and 130B may be physically connected to one another, however positioned with different tilts and decenters. In an embodiment, tertiary mirror surfaces 130A and 130B may be connected, fused, or formed together as a single reflecting body having identical prescriptions for different locations on the reflecting body, wherein the different tilts and decenters are incorporated in the shaping of the reflecting body. In an embodiment, tertiary mirror surfaces 130A and 130B may be physically separate from one another (i.e., as separate tertiary mirrors, again sharing identical prescriptions), or may be connected, fused, or formed together as separate parts of a single tertiary mirror, as is shown in FIG. 1. In an embodiment, tertiary mirror surfaces 130A-B may be shaped to reflect electromagnetic radiation at multiple tilts and decenters based on the angle and location of incidence of rays 127 from secondary mirror 120. The tilts and decenters will be described in greater detail below.

Figure 2B:
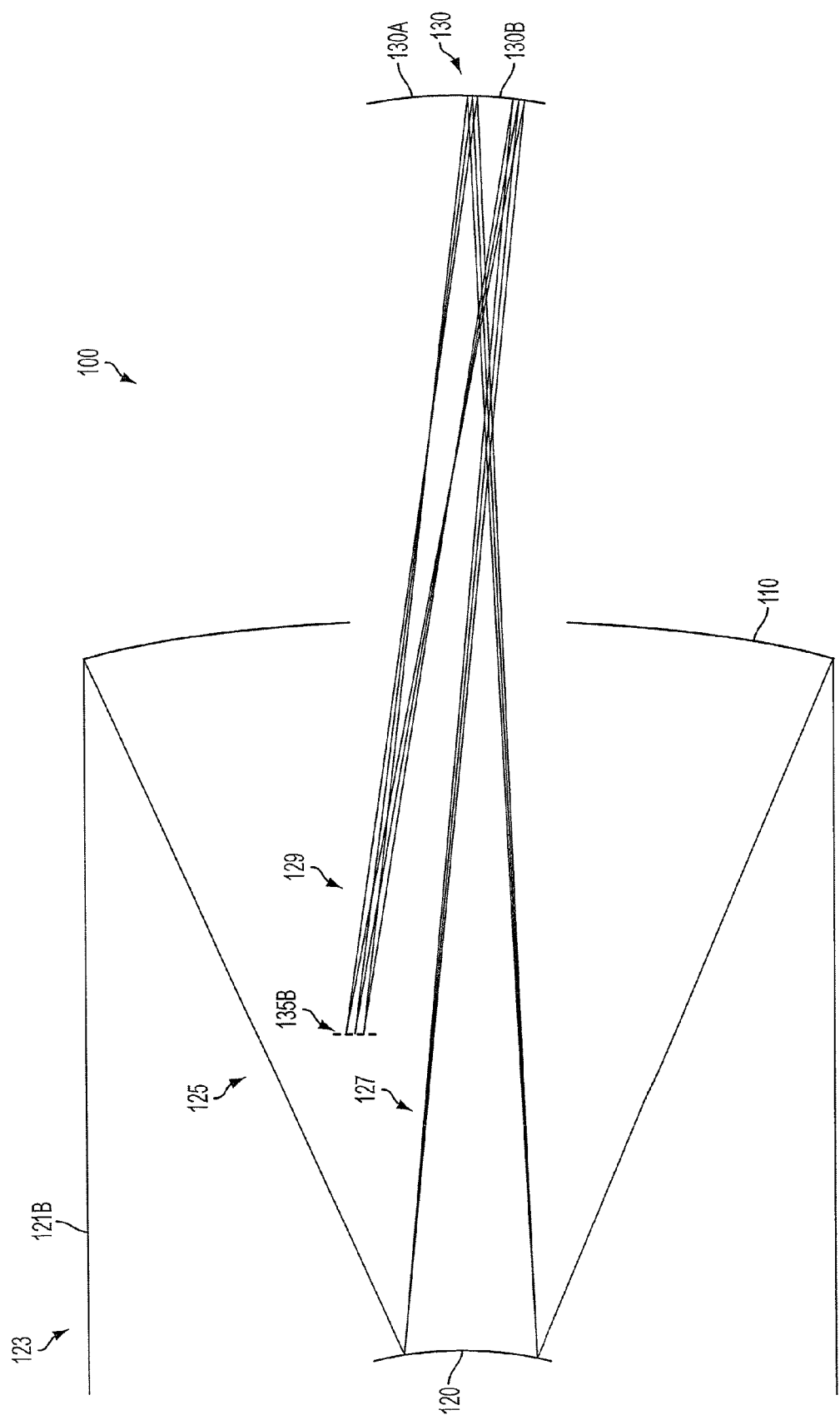

FIGS. 2A and 2B illustrate ray traces of electromagnetic radiation at each of the field offsets shown together in FIG. 1 (i.e., for channels 121A and 121B). FIG. 2A shows ray traces for electromagnetic radiation in visible channel 121A, which as noted above, illustrates incoming electromagnetic radiation 123 as having a field offset of about −0.343577°. The incoming electromagnetic radiation 123 intercepts primary mirror 110, and is reflected as beams 125 towards secondary mirror 120. Secondary mirror 120, as described above, may comprise a tilt and decenter configured to favor the visible electromagnetic radiation in channel 121A, and reflects the electromagnetic radiation of the channel to tertiary mirror surface 130A as rays 127. As noted above, in an embodiment the rays 127 may pass through an aperture of primary mirror 110. In other embodiments, in which optical system 100 is off-axis, rays 127 may be directed to pass to a side of primary mirror 110, and the aperture may not be utilized. In other embodiments, tertiary mirror surfaces 130 may be located forward of primary mirror 110, such as between primary mirror 110 and secondary mirror 120.

In the illustrated embodiment, tertiary mirror surface 130A for the shorter (i.e., visible) wavelength channel 121A may have a decenter of about −0.28126 (in) and a tilt of about −0.63372°, which may be configured to direct the corrected electromagnetic radiation 129 of visible channel 121A to a detector configured to receive the visible electromagnetic radiation. In one non-limiting embodiment, the detector for visible electromagnetic radiation may comprise a linear array of 64 time delay integration capable pixels, each pixel being 8 micrometers on a side, where the total transverse effective array length can exceed 40,000 pixels FIG. 2B shows ray traces for electromagnetic radiation in infrared channel 121B, which as noted above, illustrates incoming electromagnetic radiation 123 as having a field offset of about +0.343577°. The incoming electromagnetic radiation 123 intercepts primary mirror 110, and is reflected as beams 125 towards secondary mirror 120. Secondary mirror 120, as described above, may comprise a tilt and decenter configured to favor the visible electromagnetic radiation in channel 121A, however may still sufficiently reflect the infrared electromagnetic radiation of the channel 121B to tertiary mirror surface 130B as rays 127. Again, in an embodiment, the rays 127 may pass through an aperture of primary mirror 110. In other embodiments, in which optical system 100 is off-axis, rays 127 may be directed to pass to a side of primary mirror 110, and the aperture may not be utilized. In other embodiments, tertiary mirror surfaces 130 may be located forward of primary mirror 110, such as between primary mirror 110 and secondary mirror 120.

In the illustrated embodiment, tertiary mirror surface 130B for the longer (i.e. infrared) wavelength channel 121B may have a decenter of about −0.25748 (in), and a tilt of about −0.53085°, which may be configured to direct the corrected electromagnetic radiation 129 of infrared channel 121B to a detector configured to receive the infrared electromagnetic radiation. In one non-limiting embodiment, the detector for infrared electromagnetic radiation may comprise a linear array of 32 time delay integration capable pixels, each pixel being 64 micrometers on a side, where the total transverse array length can exceed 4,000 pixels.

Figure 3:
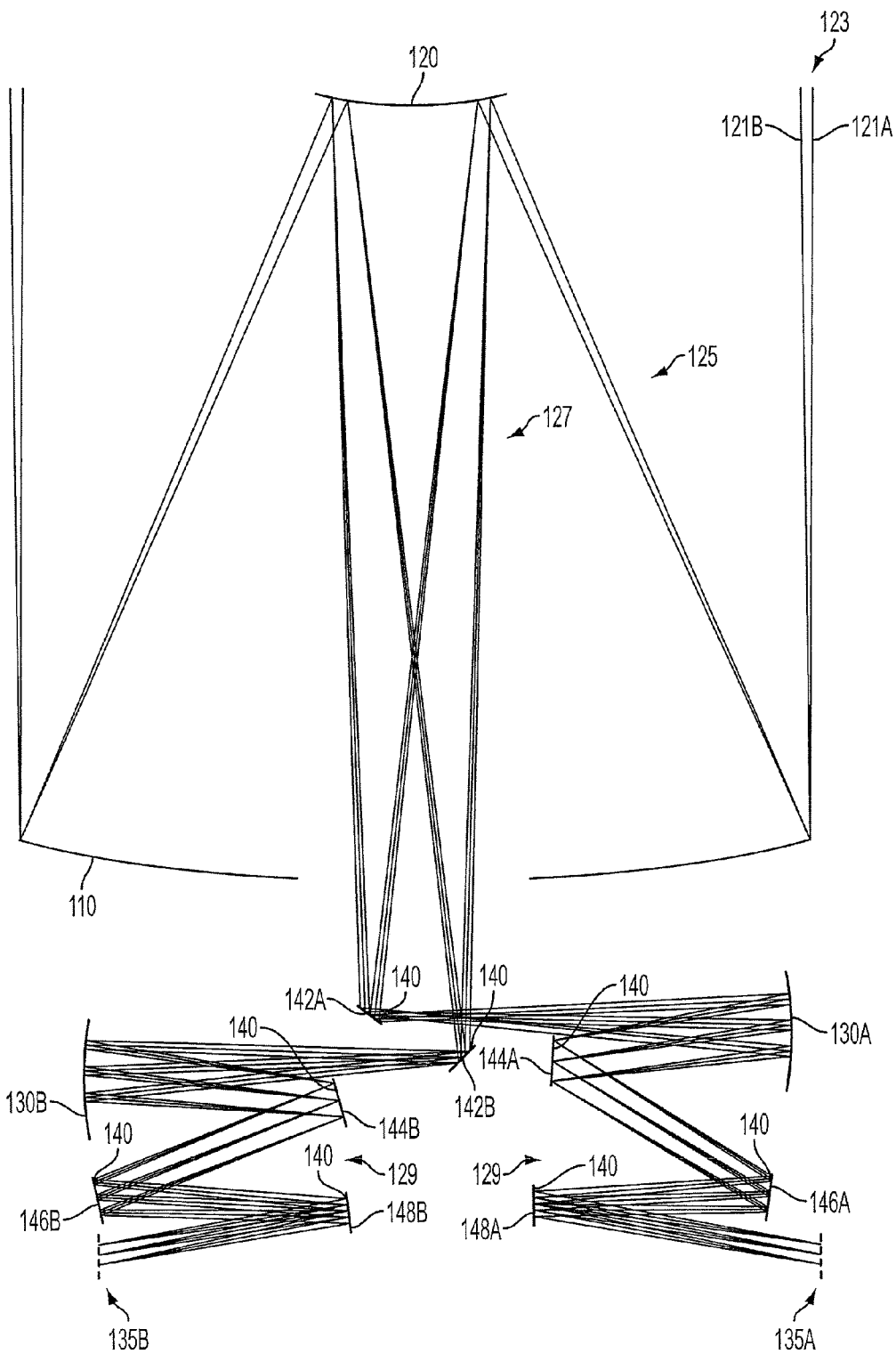
FIG. 3 depicts another exemplary illustration of a ray-trace section of the optical system of FIG. 1, showing the addition of flat mirrors to redirect the light channels.

The non-limiting embodiment illustrated in FIG. 3 is shown with the same optical prescription (i.e. the same distances between surfaces, same angle of incidence on surfaces, and same surface profile) as the embodiment of FIG. 1. As seen in FIG. 3, however, the angle of electromagnetic radiation in each channel 121A-B may be folded and redirected by one or more flat mirrors 140. Flat mirrors 140 may be any mirrors that are substantially flat, and are configured such that the angle of electromagnetic radiation incident to flat mirror 140 approximately equals the angle of electromagnetic radiation reflected by flat mirror 140. In the illustrated embodiment, as incoming electromagnetic radiation 123 intercepts primary mirror 110, it is reflected to secondary mirror 120 (not shown in FIG. 3) as beams 125. The secondary mirror 120 may then reflect the beams 125 as rays 127. In the illustrated embodiment, each channel 121A-B of rays 127 is diverged and separated by secondary mirror 120. As shown, flat mirrors 140 may include pre-tertiary fold mirror 142A, associated with channel 121A, and pre-tertiary fold mirror 142B, associated with channel 121B, which may further diverge the channels 121A-B. As seen, such divergence may permit the rays 127 of each channel 121A-B to be redirected to associated and physically separate tertiary mirror surfaces 130A-B. As shown, flat mirrors 140 may also include post-tertiary fold mirrors 144A, 146A, and 148A, associated with channel 121A, and post-tertiary fold mirrors 144B, 146B, and 148B, associated with channel 121B. Post-tertiary fold mirrors 144A-B, 146A-B, and 148A-B may be configured to further redirect the electromagnetic radiation of respective channels 121A-B that is reflected from associated tertiary mirror surfaces 130A-B. In an embodiment, post-tertiary fold mirrors 144A-B, 146A-B, and 148A-B may direct electromagnetic radiation in channels 121A-B to be received by respective detectors for each channel 121A-B (i.e. located by respective image planes 135A and 135B), or to encounter further optical elements.

As noted above, in various embodiments a mounting for optical elements of the optical system 100 may be symmetrical, but for respective tilts and decenters of some of the optical elements, such as the secondary mirror 120 and tertiary mirrors 130. In various embodiments, the detectors for each channel 121A-B may also be tilted or arranged such that corrected electromagnetic radiation 129 is received perpendicular to the detectors, based on the arrangement and configuration of optical elements of optical system 100.

One such optical prescription for optical system 100 is found in the table of FIG. 4 in accordance with an embodiment. As configured, primary mirror 110 may have an F-number of F/1.2, and optical system 100 is designed for about a +/−0.343577° initial field offset, and about a 10.57° angle of incidence constraint on the infrared channel 121B, as it would be imaged on an associated detector.

As noted above, in other embodiments, optical system 100 may be optimized to utilize different field offsets between channels 121A and 121B. For example, in an embodiment, optical system 100 may utilize an initial field offset of about +/−0.5°. An embodiment of an optical prescription for optical system 100 utilizing an initial field offset of about +/−0.5° is shown in the table of FIG. 5. Primary mirror 110 of the embodiment of FIG. 5 may correspond to an F-number of approximately F/1.2. In such an embodiment, optical system 100 may receive channel 121A of visible electromagnetic radiation at about a −0.5° field offset, while being configured to receive channel 121B of infrared electromagnetic radiation at about a +0.5° field offset. Additionally, optical system 100 may correspond to about a 10.57° angle of incidence constraint on the infrared channel.

While primary mirror 110 of the embodiment corresponding to FIG. 5 may share the same radius of curvature and conic constant values as the embodiment corresponding to FIG. 4, secondary mirror 120 may have a radius of curvature of about −49.78127 (in), and a conic constant of about −1.841455 to account for the greater field offset of about +/−0.5°. In an embodiment, secondary mirror 120 may also have a tilt and decenter that may further separate each of the channels 121A-B of electromagnetic radiation. In the embodiment, the tilt and decenter of secondary mirror 120 may again be configured to prefer the shorter wavelength band of the channels 121A-B (i.e. the visible channel 121A). For example, in an embodiment wherein channel 121A is visible electromagnetic radiation, and channel 121B is infrared electromagnetic radiation, the secondary mirror may be decentered by about −0.033774 (in), and tilted approximately −0.086209°.

In an embodiment, tertiary mirror surfaces 130 may have a radius of curvature of about −64.10273 (in), and a conic constant of about −0.70120. In an embodiment, tertiary mirror surface 130A for the shorter (i.e., visible) wavelength channel 121A may have a decenter of about −0.14656 (in), and a tilt of about −0.44166°, which may be arranged to direct the visible electromagnetic radiation to a detector configured to receive visible electromagnetic radiation. Tertiary mirror surface 130B associated with the longer (i.e., infrared) wavelength channel 121B, may have a decenter of about −0.28966 (in), and a tilt of about −0.38829°, which may be configured to direct the infrared electromagnetic radiation to a detector configured to receive the infrared electromagnetic radiation.

Other variations and configurations of primary mirror 110, secondary mirror 120, and tertiary mirror surfaces 130, are also possible. For example, in some embodiments, primary mirror 110 may be any suitable concave substantially ellipsoidal mirror, while secondary mirror 120 may be a smaller and convex substantially hyperboloidal mirror with an appropriate tilt and decenter. In this sense, substantially implies within the margins of error and constraints of manufacturing known in the art of shaping optical elements. As noted above, primary mirror 110 and secondary mirror 120 may utilize design elements of a classical Cassegrain or Ritchey-Chretien style arrangement, with primary mirror 110 having an aperture therein for electromagnetic radiation to be reflected beyond the fore-optics to tertiary mirror surfaces 130. In other embodiments, alternative configurations are possible, such as a Newtonian-like arrangement, with a flat mirror 140 at the focal point of primary mirror 110, directing electromagnetic radiation to secondary mirror 120 and tertiary mirror surfaces 130 to further correct for optical distortions correctable by a three mirror anastigmat telescope.

In some embodiments, primary mirror 110, secondary mirror 120, and tertiary mirror 130 may be designed using a computer with a ray-trace software package. The optical prescriptions of the present disclosure are non-limiting and exemplary only, and other optical prescriptions and configurations for primary mirror 110, secondary mirror 120, and tertiary mirror 130 may be utilized. Additionally, in some implementations, other flat mirrors 140 and/or beam steering mirrors may also be included in optical system 100 disclosed herein. Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. An optical system, comprising:
a primary mirror having a central axis, configured to reflect light incident thereupon;
a secondary mirror facing the primary mirror, configured to receive the light reflected from the primary mirror and redirect the light reflected from the primary mirror in a plurality of light channels, the secondary mirror having a tilt and decenter, such that an optical axis of the secondary mirror forms an angle with the central axis of the primary mirror to define the secondary mirror tilt, and such that a vertex of the secondary mirror is displaced from the central axis of the primary mirror to define the decenter; and
at least two tertiary mirror elements, each sharing a common tertiary mirror prescription but having a respective tertiary mirror element tilt and decenter associated with one of the plurality of light channels, each configured to reflect associated light channels to an associated focal point for each of the plurality of light channels, wherein each of the tertiary mirror element tilts and decenters is such that an optical axis of the at least two tertiary mirror elements form an angle with the optical axis of the secondary mirror to define the respective tertiary mirror title and decenter such that a respective vertex of the respective ones of at least two tertiary mirror elements is displaced from the optical axis of the secondary mirror to define the respective tertiary decenter.

2. The optical system according to claim 1, wherein the primary mirror comprises a concave substantially ellipsoidal configuration.

3. The optical system according to claim 1, wherein the secondary mirror comprises a convex hyperbolical configuration.

4. The optical system according to claim 1, wherein each of the plurality of light channels is associated with a different wavelength band of light.

5. The optical system according to claim 4, wherein the plurality of light channels comprises a visible light channel and an infrared light channel.

6. The optical system according to claim 1, wherein the secondary mirror has either (i) an x de-center and an x-tilt, (ii) a y de-center and a y-tilt, or (iii) both (i) and (ii).

7. The optical system according to claim 1, wherein each of the tertiary mirror elements have either (i) an associated x de-center and x-tilt, (ii) an associated y de-center and a y-tilt, or (iii) both (i) and (ii).

8. The optical system according to claim 1, further comprising one or more substantially flat mirrors configured to redirect the light in each of the channels in a light path associated with one or more of the primary mirror, the secondary mirror, and/or the tertiary mirror elements.

9. The optical system according to claim 1, further comprising a mounting structure that receives and holds the primary mirror, the secondary mirror and/or the tertiary mirror surfaces, wherein the mounting structure comprises an approximately symmetrical configuration along the central axis.

10. A method of operating an optical system comprising:

reflecting, using a primary mirror, light rays incident thereon;

reflecting, using a secondary mirror facing the primary mirror, light rays reflected from the primary mirror, as a plurality of light channels, wherein the secondary mirror has a tilt and decenter, such that an optical axis of the secondary mirror forms an angle with the central axis the primary mirror to define the secondary mirror tilt, and such that a vertex of the secondary mirror is displaced from the central axis of the primary mirror to define the decenter; and reflecting, using a plurality of tertiary mirror surfaces, the plurality of light channels to focal points associated with each light channel;

wherein each of the tertiary mirror surfaces share a common tertiary mirror prescription, and wherein each of the tertiary mirror surfaces have an associated tilt and decenter configured to separate associated light channels of the plurality of light channels, wherein each of the tertiary mirror element tilts and decenters is such that an optical axis of the at least two tertiary respective tertiary mirror title and decenter such that a respective vertex of the respective ones of at least two tertiary mirror elements is displaced from the optical axis of the secondary mirror to define the respective tertiary decenter.

11. The method of claim 10, wherein the primary mirror comprises a concave substantially ellipsoidal configuration.

12. The method of claim 10, wherein the secondary mirror comprises a convex hyperbolical configuration.

13. The method of claim 10, wherein each of the plurality of light channels is associated with a different wavelength band of light.

14. The method of claim 13, wherein the plurality of light channels comprises a visible light channel and an infrared light channel.

15. The method of claim 10, wherein the secondary mirror has (i) an x de-center and an x-tilt, (ii) y de-center and a y-tilt, or (iii) both (i) and (ii).

16. The method of claim 10, wherein each of the tertiary mirror elements have (i) an associated x de-center and x-tilt, (ii) an associated y de-center and a y-tilt, or (iii) both (i) and (ii).

17. The method of claim 10, further comprising reflecting, using one or more substantially flat mirrors, the light in each of the channels along a light path associated with the primary mirror, the secondary mirror, and/or the plurality of tertiary mirror surfaces.

18. The method of claim 10, wherein the primary mirror, the secondary mirror and/or the tertiary mirror surfaces are mounted to a substantially symmetrical mounting structure.

* * * * *